United States Patent
Hage

(10) Patent No.: US 6,635,353 B2
(45) Date of Patent: Oct. 21, 2003

(54) AMINOSILANE COATING COMPOSITION AND PROCESS FOR PRODUCING COATED ARTICLES

(75) Inventor: Martin L. Hage, Maple Grove, MN (US)

(73) Assignee: Vision-Ease Lens, Inc., Minneapolis, MN (US)

( * ) Notice: Subject to any disclaimer, the term of this patent is extended or adjusted under 35 U.S.C. 154(b) by 0 days.

(21) Appl. No.: 09/883,714

(22) Filed: Jun. 18, 2001

(65) Prior Publication Data

US 2003/0068503 A1 Apr. 10, 2003

(51) Int. Cl.[7] ............. B32B 9/04; C08G 77/26; C08G 77/24
(52) U.S. Cl. ........... 428/448; 428/447; 428/412; 528/20; 528/31; 528/38; 528/42
(58) Field of Search ............ 428/412, 446, 428/447, 448; 528/10, 12, 20, 31, 38, 39, 42

(56) References Cited

U.S. PATENT DOCUMENTS

| | | | | | |
|---|---|---|---|---|---|
| 2,832,754 | A | * | 4/1958 | Jex et al. | 260/46.5 |
| 2,920,095 | A | * | 1/1960 | Jex et al. | 260/448.8 |
| 3,166,527 | A | | 1/1965 | Ender | 260/33.2 |
| 3,837,876 | A | | 9/1974 | Mayuzumi et al. | 106/287 |
| 3,961,977 | A | | 6/1976 | Koda et al. | 106/287 |
| 4,378,250 | A | | 3/1983 | Treadway et al. | 106/287.11 |
| 4,691,038 | A | * | 9/1987 | Pohl et al. | 556/407 |
| 4,775,415 | A | * | 10/1988 | Mohr et al. | 106/14.05 |
| 4,911,864 | A | * | 3/1990 | Sato et al. | 252/500 |
| 5,030,745 | A | * | 7/1991 | Weber et al. | 556/407 |
| 5,101,055 | A | * | 3/1992 | Dinh et al. | 556/413 |
| 5,639,555 | A | * | 6/1997 | Bishop | 428/447 |
| 6,056,900 | A | * | 5/2000 | Shimizu et al. | 264/1.1 |
| 6,057,040 | A | | 5/2000 | Hage | 428/447 |
| 6,416,817 | B1 | * | 7/2002 | Rangwalla et al. | 427/377 |

* cited by examiner

Primary Examiner—Robert Dawson
Assistant Examiner—Michael J Feely
(74) Attorney, Agent, or Firm—Mark A. Litman & Associates, P.A.

(57) ABSTRACT

A novel siloxane polymer having at least a portion of the following formula:

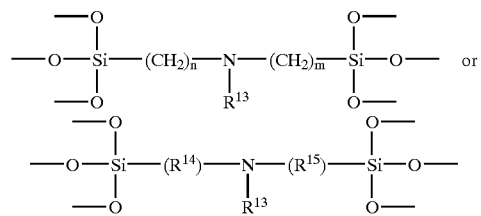

wherein $R^{13}$ is selected from hydrogen, lower alkyl group, benzyl, and phenyl group;

$R^{14}$ and $R^{15}$ are independently alkylene groups of 1 to 6 carbon atoms, xylylene, and phenylene groups of 6 to 12 carbon atoms, and;

m and n are integers independently selected from 1 through 6.

These polymers are useful as abrasion resistant coatings, especially for ophthalmic lenses.

18 Claims, No Drawings

AMINOSILANE COATING COMPOSITION AND PROCESS FOR PRODUCING COATED ARTICLES

BACKGROUND OF THE INVENTION

1. Field of the Invention

The present invention relates generally to novel polymers, polymers used in coating compositions and, more particularly, to polyorganosiloxane compositions that can form mar resistant coatings and coated articles made from these compositions.

2. Background of the Art

A variety of substrates, including those made of glass, plastic, metal, or masonry, are usefully coated with protective films to reduce their tendency to be abraded, to provide sacrificial surfaces, and to resist corrosion. It is generally desirable that protective coatings have good weathering and adhesion. It is also desirable that such coatings be resistant to thermal shock, mechanical shock, heat, humidity, and common chemicals. In addition, the coatings must be practical to prepare, apply, dry, and cure.

Some plastics are desirable substitutes for glass due to their lower density, economically advantageous fabrications, and breakage resistance. However, commercially available plastic surfaces are less abrasion resistant, mar resistant, and scratch resistant than glass. Thus, protective coatings for plastic substrates are of particular interest. This is particularly true within the field of optical uses for plastic materials (e.g., as lenses, windows, covers, containers, ophthalmic layers, and the like) where damage to the surface of the polymer can significantly affect its function.

Much effort has been exerted in this field, and several different technical approaches have been described. In particular, work has been carried out on the development of polyorganosiloxanes crosslinked by the condensation of silanol groups.

Mayazumi, in U.S. Pat. No. 3,837,876, describes a polymer formed by reacting an aminosilane with an epoxysilane, dissolving the resulting product in a solvent, and then coating various substrates with the solution of the product. Ender, in U.S. Pat. No. 3,166,527, describes the mixing of an epoxysilane with an aminosilane, then coating surfaces with both the unreacted mixture and the reacted (partially polymerized) mixture. The coating was cured by standing at room temperature for a longer period of time or by heating for a shorter period of time.

Koda, in U.S. Pat. No. 3,961,977, describes the use of a partially hydrolyzed (10–40%) aminosilane and an epoxysilane in a coating mixture. The two are dissolved in a solvent that may include a ketone. The ketone, although not claimed as a blocking agent to polymerization, appears to impede polymerization, thus extending the pot life.

Treadway and Carr, in U.S. Pat. No. 4,378,250, describe the use of aldehydes or ketones as blocking agents in polymeric compositions derived from certain aminosilanes and epoxysilanes. The reference also describes the nuance of increasing the hydrolysis of the silanes to above 40%. The reference describes greater abrasion resistance in the cured product and longer pot life in the curable composition because of the presence of the ketone acting to retard the reaction between the amine functionality and the epoxy functionality on the various reactants. The required method of preparation to make the coating is ponderous and, furthermore, there is a limited dye tintability range that can be obtained by varying the ratio of epoxy to amino within the bounds of compositions described for attaining the desired level of abrasion resistance. Replication of these compositions shows crosslink equivalent weights of at least about 173 when fully cured.

U.S. Pat. No. 6,057,040 describes a alkine bridged bis-aminosilanes, coating compositions containing these bis-aminosilanes, coatings made from those coating compositions, and articles having the cured coating compositions on at least one surface thereof. These compositions may form a crosslinked polymeric coating. At least one of the polymerizable compounds comprises an alkine-bridged bis-(aminosilane) and another preferred polymerizable compound in the composition comprises an epoxy-functional silane. The coatings provided from these compositions are highly crosslinked and display excellent mar resistance, as well as increased tintability, a very unusual combination. It is common in the art that where one of these properties increases, it is done at the expense of the other property.

SUMMARY OF THE INVENTION

A polymer comprising an alkylamine-bridged polysilane provides a wide range of unique properties that can be effectively used in many technologies, but especially in the provision of abrasion resistant coatings, and especially abrasion resistant coatings on polymeric surfaces. The product is highly crosslinked, has excellent adherence to various surfaces without the need for adhesives, and inherently provides significant antistatic protection without the need for antistatic additives. Certain alkylamine-bridged polysilanes have as many as six crosslinking bridges. The polymers can be made without catalysts using low cost monomers. The product may be derived by reaction of a halogenated hydrocarbyl substituted tri-oxyfunctional silane and an alkylamino silane. The polymer may be made by admixing a haloalkyltrialkoxysilane and an aminoalkyltrialkoxysilane in a solvent in the presence of water.

DETAILED DESCRIPTION OF THE INVENTION

The polysiloxanes described in the invention may be generally represented as a polymer having at least one repeating unit of the formulae:

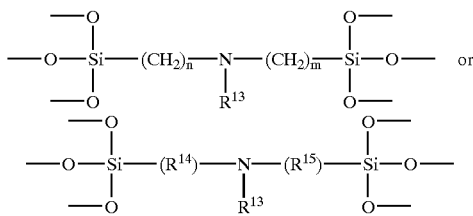

or or the corresponding hydrogen halide salts or ammonium hydrogen halide salts (e.g., hydrogen chloride, hydrogen bromide, hydrogen iodide, hydrogen fluoride salts, leaving the halide ion as a counterion on the molecule).

These formulae are not necessarily exclusive, but may in fact describe the same polymer as shown below. Preferably at least three of the (e.g., shown) six —O—groups on the silicon atoms are bonded to other polymeric units (with the at least three bonds to other polymeric units thereby forming a crosslinked polymer unit). When the —O—groups are not bonded to other polymeric units they are independently bonded to hydrogen, alkyl groups (e.g., of from 1 to 6 or 1 to 4 carbon atoms, especially 1 or 2 carbon atoms) and phenyl groups, and more preferably unsubstituted alkyl groups;

n and m are independently selected from 1 to 6, but as high as 10 is possible and in some cases may be desirable, $R^{13}$ is selected from H, alkyl group of from 1 to 4 carbon atoms (preferably 1 or 2 carbon atoms), benzyl, and phenyl groups;

$R^{14}$ and $R^{15}$ are independently selected from alkyl groups (preferably of from 1 to 6 carbon atoms, but longer alkyl groups, e.g., to 10 carbon atoms are possible and could add some additional flexibility), xylylene, and phenylene groups.

Other groups may be present in the polymer, but the above-identified novel groups must be present in the practice of the present invention. The above formulae are also contemplated to cover, and in some situations are preferably directed to ionic species where the nitrogen atom of the amine has accepted a proton, and has a counter ion. In the preferred production or synthesis process for the polymers, halogen terminated reactants are used, halogen acids (e.g., HI, HBr, HCl, and HF) may be formed, and this will inherently provide the ammonium salts. The counter ions may be replaced to form alternative ammonium salts, where such alternative counter ions could provide other unique benefits (e.g., reduce or increase color or tint of the composition). Some possible alternative counter ions include but are not limited to sulfate, sulfite, nitrate, nitrite, phosphate, and phosphite.

Haloalkyltrialkoxysilanes and Aminoalkyltrialkoxysilanes

Haloalkyltrialkoxysilanes include compounds of the formulae:

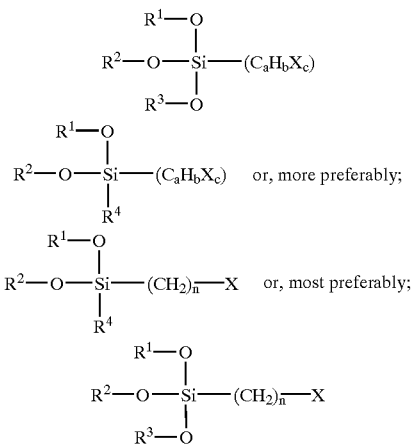

wherein $R^1$, $R^2$, and $R^3$ are independently hydrogen, monovalent hydrocarbon radicals (e.g., benzyl, phenyl groups, alkyl and other aliphatic radicals, especially alkyl groups, and most particularly methyl and ethyl);

$R^4$ is selected from hydrogen, aliphatic groups, benzyl, and phenyl groups, alkyl of from 1 to 20 carbon atoms or especially alkyl groups of from 1 to 4 carbon atoms;

X is a halogen such as Cl, Br, I, or, theoretically but less preferably, F;

a is an integer from 1 through 6;

b+c=(2a+1);

c≧1 and;

n is an integer from 1 through 4.

Preferably at least one X is at the omega position of the alkyl group. Typical halogen-substituted alkyl groups include, but are not limited to $-CH_2Cl$, $-CH_2Br$, $-CH_2I$, $-CH_2CH_2Cl$, $-CH_2CH_2Br$, $-CHClCH_2Cl$, $-CH_2CH_2CH_2Cl$, $-CH_2CH_2CH_2Br$, $-CH_2CHBrCH_2Cl$, and the like.

Aminoalkyldialkoxysilanes and Aminoalkyltrialkoxysilanes

A great number of aminoalkyltrialkoxysilane precursors are known and suitable for the present invention. Many suitable aminoalkyltrialkoxysilane precursors may be represented by the structures below;

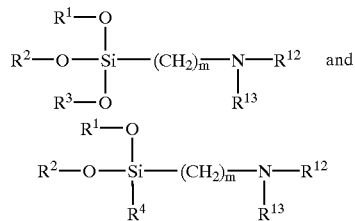

wherein $R^1$, $R^2$, and $R^3$ are independently selected, and are independently within the definitions for these groups in the haloalkyltrialkoxysilane compounds;

$R^4$ is selected from hydrogen, aliphatic groups, benzyl, and phenyl groups, alkyl of from 1 to 20 carbon atoms or especially alkyl groups of from 1 to 4 carbon atoms;

$R^{12}$ and $R^{13}$ are independently hydrogen, lower alkyl of 1 to 6 carbon atoms, benzyl or phenyl, and;

m is an integer from 1 through 6.

Some of the suitable aminoalkyltrialkoxysilanes can be alternatively described as having the general formula:

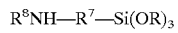

$$R^8NH-R^7-Si(OR)_3$$

where the R groups may independently be any combination of hydrogen, lower alkyl of 1 to 4 carbon atoms, benzyl, or phenyl;

$R^7$ may be an alkylene [e.g., $-CH_2-$, $-(CH_2)_n-$, wherein n is an integer between 1 and 6} bridging group, phenylene, or xylylene, and;

$R^8$ may be any stable combination of hydrogen, alkyl, benzyl, phenyl, alkoxyalkyl, aminoalkyl or other radical formed as a combination of carbon and hetero atoms, preferably alkyl of from 1 to 4 carbon atoms.

Particularly preferred due to commercial availability and price are 3-aminopropyltrimethoxysilane or 3-aminopropyltriethoxysilane.

It is understood in the art that structural nomenclature and formulae such as

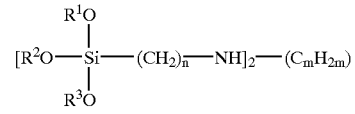

and

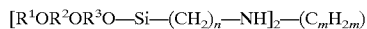

$$[R^1OR^2OR^3O-Si-(CH_2)_n-NH]_2-(C_mH_{2m})$$

are equivalents and are merely shorthand notations of each other. Similarly, structures such as $(C_mH_{2m})$ versus $(CH_2)_m$ should not be read so as to differentiate between linear alkyl and branch chain alkyl, such as between the alkine counterparts of n-propyl and i-propyl, both of which have empirical formulae Of $C_3H_7$.

For example, many known and suitable aminoalkyltrialkoxysilanes are useful for the first component are as follows: beta-aminoethyltrimethoxysilane, beta-aminoethyltriethoxysilane, beta-aminoethyltributoxysilane, beta-aminoethyltripropoxysilane, alpha-aminoethyltrimethoxysilane, alpha-aminoethyltriethoxysilane, gamma-aminopropyltrimethoxysilane, gamma-aminopropyltriethoxysilane, gammaaminopropyltributoxysilane, gamma-aminopropyltripropoxysilane, beta-aminopropyltrimethoxysilane, beta-aminopropyltriethoxysilane, beta-aminopropyltripropoxysilane, beta-aminopropyltributoxysilane, alpha-aminopropyltrimethoxysilane, alpha-aminopropyltriethoxysilane, alpha-aminopropyltributoxysilane, alpha-aminopropyltripropoxysilane, N-aminomethylaminoethyltrimethoxysilane, N-aminomethylaminomethyltripropoxysilane, N-aminomethyl-beta-aminoethyltrimethoxysilane, N-aminomethyl-beta-aminoethyltriethoxysilane, N-aminoethyl-beta-aminoethyltripropoxysilane, N-aminomethyl-gamma-aminopropyltrimethoxysilane, N-aminomethyl-gamma-aminopropyltriethoxysilane, N-aminomethyl-gamma-aminopropyltripropoxysilane, N-aminomethyl-beta-aminopropyltrimethoxysilane, N-aminomethyl-beta-aminopropyltriethoxysilane, N-aminomethyl-beta-aminopropyltripropoxysilane, N-aminopropyltripropoxysilane, N-aminopropyltrimethoxysilane, N-(beta-aminoethyl)-beta-aminoethyltrimethoxysilane, N-(beta-aminoethyl)-beta-aminoethyltriethoxysilane, N-(beta-aminoethyl)-beta-aminoethyltripropoxysilane, N-(beta-aminoethyl)-beta-aminoethyltrimethoxysilane, N-(beta-aminoethyl)-alpha-aminoethyltriethoxysilane, N-(beta-aminoethyl)-alpha-aminoethyltripropoxysilane, N-(beta-aminoethyl)-beta-aminopropyltrimethoxysilane, N-(beta-aminoethyl)-gamma-aminopropyltriethoxysilane, N-(beta-aminoethyl)-gamma-aminopropyltripropoxysilane, N-(beta-aminoethyl)-gamma-aminopropyltrimethoxysilane, N-(beta-aminoethyl)-beta-aminopropyltriethoxysilane, N-(beta-aminoethyl)-beta-aminopropyltripropoxysilane, N-(gamma-aminopropyl)-beta-aminoethyltrimethoxysilane, N-(gamma-aminopropyl)-beta-aminoethyltriethoxysilane, N-(gamma-aminopropyl)-beta-aminoethyltripropoxysilane, N-methylaminopropyltrimethoxysilane, beta-aminopropylmethyldiethoxysilane, gamma-diethylenetriaminopropyltriethoxysilane.

Optional Coreactants

An epoxy-functional silane optionally may be added in the present invention and may be described by the formula:

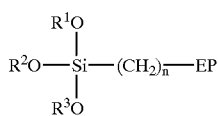

wherein $R^1$, $R^2$, and $R^3$ are independently selected from hydrogen, aliphatic groups or aromatic groups which complete a siloxane on the silicon (Si) atom, preferably alkyl groups, benzyl groups or phenyl groups, and more preferably unsubstituted alkyl groups;

n is as described above, and;

EP represents a glycidyl (e.g., glycidoxy) or cyclohexaneoxide (epoxycyclohexyl) or cyclopentaneoxide (epoxycyclopentyl) epoxy polymerizable group.

It is well recognized within the art that some substitution of the compounds used in forming the compositions is not only tolerable, but in some instances highly desirable. Where the term "group" is used to refer to a substitutent or nucleus, that term is specifically inclusive of both substituted and unsubstituted substituents or nuclei. For example, the term "alkyl group" refers to not only the pure hydrocarbon within the definition of alkyl (e.g., methyl, ethyl, octyl, isooctyl, dodecyl, etc.), but also those materials within the art recognized as substituted alkyls, such as monosubstituted haloalkyl, hydroxyalkyl, ether groups (e.g., —$CH_2$—O—$CH_2$—, etc.), and the like. Where the chemical group is used without description of a group or described as a moiety, such as with ethyl or hexyl moiety, or decyl, that phrase excludes substitution.

Partial Hydrolyzates

The haloalkyltrialkoxysilane and aminoalkyltrialkoxysilane precursors, as well as the optional epoxyalkyltrialkoxysilane (as well as any other silane) may be, but are less preferably, partially hydrolyzed in forming compositions of the present invention. Coatings may thus be formed where said haloalkyltrialkoxysilanes and aminoalkyltrialkoxysilanes or their dialkoxysilane counterparts are a hydrolyzed (which includes partial hydrolysis) product of such compounds as are all known and commercially available.

Hydrolyzate refers to the initial products of the reaction of water with the alkoxy groups of the haloalkyltrialkoxysilane and aminoalkyltrialkoxysilane precursors as well as any other siloxane monomers such as an epoxyalkyltrialkoxysilane precursor. Silanols are relatively unstable and tend to condense spontaneously. Thus, the simultaneous hydrolysis of a mixture of different silanes is normally referred to as co-hydrolysis, and a hydrolyzate refers to the end product of hydrolysis where some condensation has normally occurred during the hydrolysis reaction, so that some homopolymers or copolymers are formed.

The reagent or precursor compounds of both the haloalkyltrialkoxysilanes and the aminoalkyltrialkoxysilanes used in the practice of the present invention include at least two, and usually three, alkoxy groups covalently bonded to a silicon atom. Each of these reagents may be partially hydrolyzed to form the partial hydrolyzate thereof by adding enough water to hydrolyze greater than 20% of the two or three available alkoxy groups, and more preferably having enough water to hydrolyze more than about 40% of these alkoxy groups.

Partial hydrolysis of the siloxane compounds may be performed by adding enough water to hydrolyze an amount of the available alkoxy groups, and an approximately equal amount of a water soluble alcohol, such as ethanol or methanol, may be added to aid solubility as well as stability. The mixture may be equilibrated, or ripened, for a sufficient period of time to effect the partial hydrolysis. The partial hydrolysis may be performed either by stripping off volatiles, such as the volatile alcohol byproduct of the hydrolysis, or not.

As a basic background to the practice of the present invention, the following underlying reactions and processes are believed to occur. The haloalkyltrialkoxysilane reagent, herein described as Siloxane—$CH_2$—X for simplicity, is directly reacted with the aminoalkyltrialkoxysilane, herein described as Siloxane—$CH_2$—$N(R)_2$ for simplicity. Solvents (ketones such as butanone, propanone, etc. or alcohols e.g., methanol, ethanol, propanol, etc.) are not essential to the reaction and may be used, as well as mixtures of these and other organic solvents (e.g., methylene chloride, chloroform, methylene bromide, bromoform, 1,2-dichloroethane, 1,2-dichloro-1,2-dibromoethylene, etc.).

In reacting the aminoalkyltrialkoxysilane with the haloalkyltrialkoxysilane, the following reaction occurs:

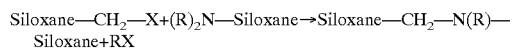

with the siloxanes crosslinking across molecules. The product of the present invention, comprising the condensation product of the reaction between at least the haloalkyltrialkoxysilane and the aminoalkyltrialkoxysilane displays a potentially wide range of properties and benefits, including but not limited to:

1) inexpensive reagents;

2) high abrasion resistance (e.g., as measured by a Bayer test);

3) strong adherence to polymeric substrates, especially to polycarbonate lens material, even without the use of primers, adhesives, or surface treatment;
4) good transparency and low color content;
5) strong solvent resistance;
6) ease of manufacture and low cost of the synthetic procedure;
7) consistent coating properties;
8) improved stability against gelation, longer pot life, and no need of refrigeration;
9) inherent antifog and antistatic properties, particularly where the salt form of the polymer is used;
10) reduced toxicity as compared to some abrasion resistant coating compositions and reagents, such as organic epoxy monomers;
11) greater performance stability, with greater stability in aqueous or alcoholic environments where epoxy compounds tend to show deficiencies; and
12) simplicity of use in a single step reaction or coating process.

Some or all of these benefits may be obtained in specific compositions and polymers made according to the present teachings. In addition, some unique benefits have been found with regard to the level and quality of abrasion resistance provided on ophthalmic lenses using these compositions.

In the field of ophthalmic or sports lenses, a variety of different surface properties may be desired from a single lens. For example, abrasion resistance is quite important for the longevity of the lens, as scratches or other surface damage can be annoying, unattractive or even dangerous if they cause structural flaws in the lens. Reduced haze in the lens is also desirable for improved quality of vision.

Haze is often measured by a haze meter, in which collimated light is directed against a surface, and the intensity of the light is measured (often as a percent of scattered light). The change in haze caused by surface abrasion is the simple measurement of the value of the final haze ($H_f$) less the value of the initial haze ($H_i$). The Bayer ratio can be expressed as:

$$\frac{(H_f) - (H_i)[\text{standard lens}]}{(H_f) - (H_i)[\text{test specimen}]} = \text{Bayer ratio}$$

where the test specimen is the sample that is being measured for abrasion resistance and the standard lens is made of polymerized di(ethylene glycol) bis(allyl carbonate), which lenses are commonly available in the ophthalmic lens industry. In addition to being properly conditioned, both lenses are to be of a specific base curve, diameter, thickness, and power. As the damage done to a surface increases, the haze increases. The Bayer ratio, therefore, shows the relative abrasion resistance between the test specimen and the standard lens material, which is commonly used as a benchmark in the ophthalmic lens industry. Higher Bayer ratios indicate greater degrees of abrasion resistance.

Values of the Bayer ratio between 2 and 4 are a significant improvement over polymerized di(ethylene glycol) bis(allyl carbonate), which is the industry standard, but higher ratios are desirable, as long as the other properties (moisture sensitivity, adhesion, coloration, flexibility, etc.) are not adversely affected. Unfortunately, additional layers must be provided on the outer surface of ophthalmic lenses for their benefits to be provided. Because these additional layers are sometimes applied over the abrasion resistant coating layer, unless the separate layer has unique abrasion resistance properties in addition to its primary property (e.g., antireflective layers, such as those made of siloxanes, titanates, titania, metal oxides, and the like), the abrasion resistance is sometimes reduced. This will not occur where the abrasion resistance, as measured by the Bayer ratio, is initially relatively low (e.g., less than four), but can occur when the abrasion resistance of the coating is high (e.g., 6 or more). It has been found that the coating compositions of the present invention, even when the coating provides a Bayer ratio of 4, 5, 6 or higher, the application of standard antireflective layer will still display an increased Bayer ratio, raising that of the coating by 0.5 to 2 units. This is a unique and unexpected benefit of the practice of the present invention.

If necessary or desired, a solvent may be provided to adjust the composition to the proper coating viscosity for the method of application. When the coating is applied to a substrate, it can be polymerized and hardened in an oven that has access to air of normal humidity. The resulting coating is crosslinked by silanol condensation and by the alkylation of the amino group of the aminoalkyltrialkoxysilane to provide an exceptionally durable coating perhaps due to the latter crosslinking reaction which would provide higher crosslink density (i.e., a lower crosslink equivalent weight) than is normally possible where other trialkoxysilanes are used, thereby resulting in better scratch resistance than would otherwise be possible. In addition, a range of tint values and shorter tinting times can be produced by suitable variations of the proportions of the components. There are numerous classes of catalysts, which may also be used to improve the speed or manner of crosslinking and curing of the polymerizable groups. For example, perfluorinated alkylsulfonyl methides (and their amide counterparts) are known to be active catalysts for the silane condensation and for epoxy polymerization. Photoinitators such as the onium catalysts with complex fluorinated anions (e.g., triphenylsulfonium hexafluoroantimonate, diphenyl iodonium tetrafluoroborate, diphenyl, phenylthiophenylsulfonium hexafluoroantimonate) are known photinitators for both the epoxy polymerization and the silane condensation reactions.

Copolymerizable monomers, oligomers or polymers may also be present in the compositions of the present invention as well as fillers, adjuvants and conventional additives. For example, additional silane monomers, epoxy monomers or other crosslinkable materials may be present, such as titanate esters, acrylatesilanes (e.g., 3-acryloxypropyltrimethoxysilane, 3-methacryloxypropyltrimethoxysilane), and the like. Caution should be exercised in these options to assure that the crosslink density is not severely diminished, which would worsen the hardness of the surface of the coating, or that other physical parameters are not adversely affected, as by the addition of softness or too much flexibility to the material composition of the coating. Additives to the compositions which would be particularly useful would include UV absorbers, such as benzophenones, Tinuvin™, and other known classes of UV absorbers for polymeric materials, dyes, pigments, flow control agents, antistatic agents, surfactants, and the like.

The coating composition of the present invention is suitable for coating plastic substrates such as windows, windscreens, goggles, ophthalmic lenses, watch face guards, light emitting diode panel covers, liquid crystal display covers, dashboard arrays, computer screens, and the like. In particular, the coating composition is suitable for providing an abrasion resistant and mar resistant coating for polycarbonate ophthalmic lenses.

Suitable solvents include many of the solvents commonly used for silanes, aminosilanes, and the like, including, but not limited to alcohols, halogenated hydrocarbons such as, but are not limited to, dichloromethane, trichloromethane, 1,1,1-trichloroethane, ketones (e.g., methyethyl ketone, methylpropyl ketone, ethylethyl ketone), polar solvents, aromatic hydrocarbon solvents (e.g., toluene), alcohols (e.g., methanol, ethanol, 1-propanol, 2-propanol, 2-butanol, etc.), glycol ethers (e.g., 2-butoxyethanol, and 1-methoxy-2-propanol), and the like. The compositions of the present invention may be free of ketones, which are required in U.S. Pat. No. 4,378,250, and may be hydrolyzed before or after formation of the adduct of the haloalkyltrialkoxysilanes and the aminoalkyltrialkoxysilanes.

The composition preferably contains a surfactant that is used as a wetting agent for regulating film thickness and enhancing the cosmetic appearance of the coated article. An example is Fluorad FC-430, a fluoroester (e.g., fluorinated alkyl ester or fluoroaliphatic polymeric ester) fluorosurfactant that is manufactured by the 3M Corporation, St. Paul, Minn. Another example is FSO-100, which is manufactured by the DuPont Corporation. The examples set forth below are intended for illustrative purposes and should not be construed as limiting the invention in any way. A flow control agent such as a polydimethylsiloxane or a derivative thereof, particularly those having ethyleneoxide side chains, may be used to improve the flow and leveling of the coating to obtain a more uniform film thickness as well as to improve the cosmetic appearance of the coated article. An example is BYK 333, a polydimethylsiloxane that is manufactured by BYK-Chemie USA, Wallingford, Conn.

EXAMPLES

Example 1

The following materials were provided and then added in the order listed, with continuous stirring to mix the ingredients:

| Material | Percent (By Weight) |
| --- | --- |
| a) 3-chloropropyltrimethoxysilane | 19.55 |
| b) 3-aminopropyltimethoxysilane | 17.63 |
| c) methanol | 52.09 |
| d) water (deionized) | 10.63 |
| e) FC-430 (fluorinated surfactant) | 0.10 |

The coating solution was allowed to stand and react at room temperature for twenty-four hours at room temperature prior to use. The coating may be applied by any convenient or commercial process including, but not limited to dipping, hand spreads, spin coating, spraying, curtain coating, meniscus coating, slot coating, and the like. The temperature of the coating solution may vary within a wide range, with temperatures between about 35° F. and 80° F. being most easily used. Curing is easily effected by placing the coated substrate (e.g., a coated ophthalmic lens) into a controlled temperature such as an oven at 180° F. for thirty minutes, and then increasing the oven temperature to 265° F. and holding the coated element at that elevated temperature for an additional four hours. The coated substrates were then cooled in air at room temperature.

Examples 2–5

In Example 2, the following ingredients were combined in the following order:

| Material | Percent (By Weight) |
| --- | --- |
| a) 3-aminopropyltimethoxysilane | 18.69 |
| b) 3-chloropropyltrimethoxysilane | 20.72 |
| c) water (deionized) | 11.27 |
| d) propanone | 49.32 |
| TOTAL | 100.00 |

In Example 3, the ingredients were added in the same proportions in the order of a), d), b) c).

In Example 4, the ingredients were added in the same proportions in the order of a), c), b) d).

In Example 5, the ingredients were added in the same proportions in the order of a), d), b) and c).

All solutions were mixed at room temperature. Samples were stored at room temperature, in a refrigerator at 40° F., and also in a freezer at 0° F. The samples were then warmed at room temperature and then spin coated onto polycarbonate ophthalmic lenses. The results were as follows:

| Example | Percent Haze | Thickness (microns) | Yellowness Index | 30 min Post Tint TLT | 30 min Post Tint Adhesion | Bayer Ratio |
| --- | --- | --- | --- | --- | --- | --- |
| 2 | 0.13 | 8.8 | 2.9/2.6 | 65.8 | Pass | 4.63 |
| 3 | 2.63 | 8.8 | 3.0/2.7 | 41.5 | Pass | — |
| 4 | 4.25 | 8.5 | 2.5/2.3 | 66.9 | Pass | 4.25 |
| 5 | — | — | 2.2/1.9 | — | — | — |

The Coating of Example 5 peeled off. The haze was high on Example 3, so a Bayer ratio was not determined.

Examples 6–13

In Example 6, the following ingredients were combined in the following order:

| Material | Percent (By Weight) |
| --- | --- |
| a) 3-aminopropyltimethoxysilane | 18.69 |
| b) 3-chloropropyltrimethoxysilane | 20.72 |
| c) water (deionized) | 11.27 |
| d) propanone | 49.32 |
| TOTAL | 100.00 |

The order of addition of the ingredients in the remaining examples were as follows:

7) a), d), b) and c).
8) a), c), b) and d).
9) a), d), c) and b).
10) same as 6, but butanone was used in place of propanone.
11) same as 7, but butanone was used in place of propanone.
12) same as 8, but butanone was used in place of propanone.
13) same as 9, but butanone was used in place of propanone.

The procedure used in all of these examples was as follows. The materials were added at room temperature in the order provided while stirring well between each addition. A small aliquot of each sample was stored in a refrigerator and another aliquot stored at room temperature. The remainder was stored in the freezer. Each sample was checked for gelation for each day. One day after the preparation, the room temperature stored samples were squirted onto a pair of lenses, cured as shown in Example 1. No samples gelled at room temperature after one week, and sample 9 peeled from the lens before testing (analogous to Example 5). The same order of addition in example 13 did not peel off the lens and performed well. The acetone polymers were slightly more yellow than these samples, possibly because of enamine polymer forming with the ketone.

| Example | Percent Haze | Thickness (microns) | Yellowness Index | 30 Minute Post Tint TLT | Post Tint Adhesion | pH | Bayer. Ratio |
|---|---|---|---|---|---|---|---|
| 6 | 0.16 | 9.7 | 3.3/3.0 | 59.4 | Pass | 10.2 | 3.75 |
| 7 | 1.80 | 10.9 | 3.8/3.5 | 45.2 | Pass | 10.1 | 3.73 |
| 8 | 0.20 | 9.9 | 3.1/2.8 | 59.1 | Pass | 10.2 | 3.58 |
| 9 | — | — | — | — | — | 10.2 | — |
| 10 | 0.21 | 9.3 | 1.8/1.7 | 63.3 | Pass | 10.2 | 3.75 |
| 11 | 0.31 | 8.2 | 1.7/1.6 | 59.9 | Pass | 10.2 | 4.26 |
| 12 | 0.25 | 7.4 | 1.6/1.5 | 55.3 | Pass | 10.1 | 3.50 |
| 13 | 0.27 | 7.5 | 1.7/1.6 | 58.2 | Pass | 10.2 | 4.04 |

Examples 14–16

These examples investigate lower coating thickness to reduce coloration by lowering the solids content. Two separate samples (A and B) were prepared as follows:

| Material | A % (wt) | A Grams | B % (wt) | B Grams |
|---|---|---|---|---|
| a) 3-aminopropyl-timethoxysilane | 7.48 | 59.84 | 14.95 | 119.60 |
| b) 3-chloropropyl-trimethoxysilane | 8.29 | 66.32 | 16.57 | 132.56 |
| c) water (deionized) | 4.51 | 36.08 | 9.01 | 72.08 |
| d) propanone | 79.72 | 637.76 | 59.47 | 475.76 |
| TOTAL | 100.00 | 800.00 | 100.00 | 800.00 |

The materials were added at room temperature in the order listed while mixing the ingredients. The composition was stored overnight in a freezer, and then coated at 40° F. the following day. Ten pairs of lenses were coated with each composition and a competitive composition (Comparative Example 16) comprising an epoxysilane abrasion resistant coating, which was used as an experimental control. The results are shown below.

Example 17

This example shows the use of a formulation with methanol as the solvent.

| Material | Percent (By Weight) |
|---|---|
| 3-aminopropyltimethoxysilane | 16.57 |
| 3-chloropropyltrimethoxysilane | 14.95 |
| Methanol | 59.36 |

-continued

| Material | Percent (By Weight) |
|---|---|
| Water (deionized) | 9.01 |
| BYK 333 | 0.01 |
| FC-430 (surfactant) | 0.10 |
| TOTAL | 100.00 |

The material was prepared by placing the 3-aminopropyltrimethoxysilane in a clean, dry container, adding the 3-chloropropyltrimethoxysilane while mixing. Then adding the methanol while stirring and then adding the water while stirring. The BYK 333 is then added followed by the addition of the fluorosurfactant. The mixture is stirred thoroughly for 24 hours at room temperature. The coating is then stored below 40° F. until use. The coating had been applied by dip coating, precuring at 180° F. for thirty minutes, and then final curing at 265° F. for 4 hours. At a dry film thickness of 5.0 microns, this coating provided a percent haze of 0.3 and a Bayer ratio of 6.0. Adhesion was tested by ASTM D 3359.

The polymers of the invention may be produced over time without need for catalysis, or heating, or addition of other

| Example | 14 | 15 | 16 |
|---|---|---|---|
| Refractive Index | 1.5290 | 1.5189 | 1.5308 |
| Thickness (microns) | 2.9 | 7.9 | 11.3 |
| Yellowness Index | 3.47/3.15 | 1.32/1.23 | 3.46/3.2 |
| Percent Haze | 6.2 | 0.79 | 0.28 |
| Bayer Ratio | 3.88 | 4.66 | 5.01 |
| Cyclic Humidity | Passed adh., crazed | Passed adh., crazed | Failed adh., crazed |
| 30 min Boiling DI Water | Passed adh., crazed | Passed adh., crazed | Failed adh., crazed |
| 30 min DI Tint Adhesion | Pass | Pass | Pass |
| 30 min DI TLT | 85.6 | 80.3 | 80.4 |
| 30 min Tap Tint Adhesion | Pass | Pass | Pass |
| 30 min Tap TLT | 86.5 | 85.4 | 84.4 | materials. As noted, various numbers of the halogen atoms on the halogenated carbon atoms may be randomly replaced, so that variations in the resulting polymers will occur, with some (few) unreacted monoaminoalkyltrialkoxysiloxanes being present as well. The aminoalkyltrialkoxysilanes will comprise various distributions of materials within the formulae presented above.

General Process for Application of Coatings to Lenses

As the coatings of this invention tend to be somewhat reactive at room temperature, as a general precaution and good practice, the coatings should be stored at about 0° F. until they are to be applied. Prior to application, the coating solution is warmed to the appropriate temperature for application, such as room temperature. The appropriate temperature is determined according to the solvent used, the desired drying rate, and the desired coating characteristics. Typical coating temperatures are from 30 to 60° F. The coating is typically applied by dip coating, although spin coating or any other process compatible with the surface to be treated is acceptable. The coated article, such as an ophthalmic lens, is then placed into a forced air oven at an appropriately elevated temperature, usually from 120 to 200° F., preferably from 170 to 190° F. The lens is maintained for an amount of time sufficient to provide the degree of initial cure desired in the article when it is removed from the oven. With thermal curing (as compared to photoinitiated cure or highly catalyzed thermal curing), the lens may be treated for a few minutes to a few hours, typically from 15 minutes to 1 hour. Alternatively, rather than using a convection oven, this initial cure may be effected by radiant heat on exposure to a source of infrared light. After this initial temperature treatment, the lenses should be transferred immediately to a second heating environment such as another forced air oven at a temperature above 250° F. Preferably the second oven temperature is between 260 and 270° F.

The compositions of the present invention have been described primarily for use with the coating of optical elements such as ophthalmic lenses, but may also be used to provide abrasion resistance to many other substrates, such as, but not limited to, flat glass, polymeric film, light filters, countertops, finger nails, CRT screens, LED screens, LED panels, furniture and the like.

What is claimed is:

1. A siloxane polymer comprising repeating elements of the formula selected from the group consisting of:

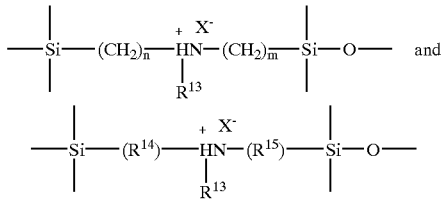

wherein $R^{13}$ is selected from the group consisting of hydrogen, lower alkyl group, benzyl, and phenyl group;

$R^{14}$ and $R^{15}$ are independently selected from the group consisting of alkylene groups of 1 to 6 carbon atoms, xylylene, and phenylene groups of 6 to 12 carbon atoms, X is a halide anion, and;

m and n are independently selected from 1, 2, 3, 4, 5, and 6.

2. The polymer of claim 1 wherein the nitrogen atom shown in the formulae is present as the salt of a hydrogen halide.

3. A process for manufacturing the polymer of claim 2 comprising admixing a) a haloalkylsilane and b) an aminoalkylsilane selected from the group consisting of an aminoalkyltrialkoxysilane and an aminoalkyldialkoxysilane in a solvent in the presence of water.

4. The polymer of claim 1 wherein the nitrogen atom shown in the formulae is present as the salt of an ammonium halide.

5. A substrate having at least one surface coated with an abrasion resistant coating comprising the siloxane polymer of claim 1.

6. The substrate of claim 5 wherein the substrate comprises a polymeric opthalmic lens.

7. The substrate of claim 6 wherein the polymeric ophthalmic lens comprises a polycarbonate ophthalmic lens.

8. The substrate of claim 6 wherein an antireflective coating is present over said abrasion resistant coating to form a combination on the lens of an antireflective coating and an abrasion resistant coating and the combination of antireflective coating and abrasion resistant coating provides a Bayer ratio that is higher than the Bayer ratio of the abrasion resistant coating alone.

9. The substrate of claim 8 wherein the Bayer ratio of the abrasion resistant coating alone is higher than 4.0 and the Bayer ratio of the abrasion resistance of the combination of antireflective layer and abrasion resistant coating is greater than 5.0.

10. The substrate of claim 5 wherein an antireflective coating is present over said abrasion resistant coating to form a combination on the lens of an antireflective coating and an abrasion resistant coating and the combination of antireflective coating and abrasion resistant coating provides a Bayer ratio that is higher than the Bayer ratio of the abrasion resistant coating alone.

11. The substrate of claim 10 wherein the Bayer ratio of the abrasion resistant coating alone is higher than 4.0.

12. A process for manufacturing the polymer of claim 1 comprising admixing a) a haloalkoxysilane and b) an aminoalkoxysilane selected from the group consisting of an aminoalkyltrialkoxysilane and axminoalkyldialkoxysilane in a solvent in the presence of water.

13. The process of claim 12 wherein the haloalkyltrialkoxysilane has the formula:

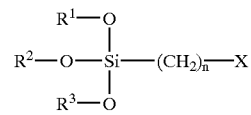

wherein $R^1$, $R^2$, and $R^3$ are independently selected from hydrogen, lower alkyl groups, benzyl, and phenyl groups;

n is an integer of from 1 through 6, and;

X comprises Cl, Br, I, or F.

14. The process of claim 13 wherein the aminoalkyltrialkoxysilane has the formula:

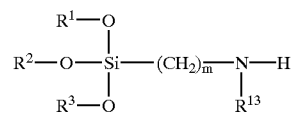

wherein $R^1$, $R^2$, and $R^3$ are independently selected from hydrogen, lower alkyl groups, beuzyl, and phenyl groups;

m is an integer of from 1 through 6, and;

$R^{13}$ comprises a hydrogen, lower alkyl, beuzyl or phenyl.

15. The process of claim 14 wherein the —(CH$_2$)$_n$—X group of the haloalkyltrialkoxysilane comprises a moiety of the formula:

wherein X is Br, Cl or I;
a is an integer from 1 through 6;
b+c=(2a+1), and;
c≧1.

16. The process of claim 12 wherein the aminoalkyltrialkoxysilane or aminoalkyldialkoxysilane is selected from one of the formulae:

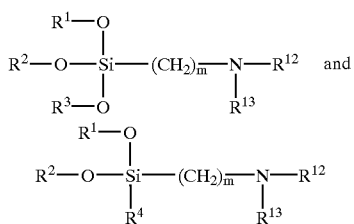

wherein R$^1$, R$^2$, and R$^3$ are independently selected from the group consisting of hydrogen, lower alkyl groups of 1 to 4 carbon atoms, benzyl, and phenyl groups;
m is an integer from 1 through 6;
R$^{12}$ and R$^{13}$ are selected from the group consisting of a hydrogen, lower alkyl group, benzyl or phenyl group, and;
R$^4$ is selected from hydrogen, aliphatic groups, benzyl, phenyl groups, and alkyl of from 1 to 4 carbon atoms.

17. The process of claim 12 wherein the haloalkyldialkoxysilane is selected from one of the formulae:

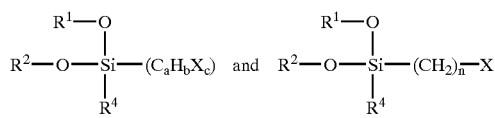

wherein R$^1$, R$^2$, and R$^3$ are independently selected from the group consisting of hydrogen, lower alkyl groups of 1 to 4 carbon atoms, benzyl, and phenyl groups;
n is an integer from 1 through 6;
X comprises Cl, Br, I, or F;
a is an integer front 1 through 6;
b+c=(2a+1);
c≧1, and;
R$^4$ is selected from hydrogen, aliphatic groups, beuzyl, phenyl groups, and alkyl of from 1 to 4 carbon atoms.

18. The process of claim 12 wherein the haloalkyldialkoxysilane is selected from the formula:

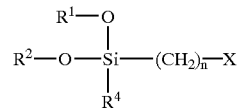

wherein R$^1$, R$^2$, and R$^3$ are independently selected from the group consisting of hydrogen, lower alkyl groups of 1 to 4 carbon atoms, benzyl, and phenyl groups;
n is an integer from 1 through 6;
X comprises Cl, Br, I, or F; and
R$^4$ is selected from hydrogen, aliphatic groups, benzyl, phenyl groups, and alkyl of from 1 to 4 carbon atoms.

* * * * *